United States Patent
Korhonen et al.

(10) Patent No.: US 6,197,264 B1
(45) Date of Patent: Mar. 6, 2001

(54) PROCESS AND AN APPARATUS FOR POLYMERIZATION OF OLEFIN MONOMERS

(75) Inventors: Esa Korhonen, Porvoo; Pauli Leskinen, Helsinki, both of (FI); Ward Mennes, Lommel (BE); Fred Bergmann, Langesund (NO)

(73) Assignee: Borealis A/S (DK)

( * ) Notice: Subject to any disclaimer, the term of this patent is extended or adjusted under 35 U.S.C. 154(b) by 0 days.

(21) Appl. No.: 09/142,700

(22) PCT Filed: Mar. 12, 1997

(86) PCT No.: PCT/FI97/00162
§ 371 Date: Oct. 19, 1998
§ 102(e) Date: Oct. 19, 1998

(87) PCT Pub. No.: WO97/33920
PCT Pub. Date: Sep. 18, 1997

(30) Foreign Application Priority Data

Mar. 13, 1996 (FI) .......................................... 961152

(51) Int. Cl.[7] ................. B01J 8/38; C08F 2/34; C08F 2/02
(52) U.S. Cl. .................. 422/136; 422/134; 422/139; 422/141; 422/142; 526/88; 526/918
(58) Field of Search .................. 526/88, 910; 422/134, 422/136, 139, 141, 142

(56) References Cited

U.S. PATENT DOCUMENTS

| | | | |
|---|---|---|---|
| 2,533,058 | * 12/1950 | Shaffer et al. | 422/134 |
| 2,740,696 | * 4/1956 | Longwell et al. | 422/139 |
| 2,893,851 | 7/1959 | Georgian | 23/288 |
| 5,077,358 | * 12/1991 | Durand et al. | 526/88 |
| 5,087,522 | * 2/1992 | Baily et al. | 526/88 |
| 5,410,002 | * 4/1995 | Govoni et al. | 526/88 |
| 5,529,965 | * 6/1996 | Chang | 526/113 |
| 5,912,352 | * 11/1998 | Brant et al. | 526/88 |

FOREIGN PATENT DOCUMENTS

| | | | |
|---|---|---|---|
| 2849187 | 5/1980 | (DE) | B01J/19/18 |
| 0279153 | 8/1988 | (EP) | C08F/10/00 |
| 0434124 | 6/1991 | (EP) | B01J/19/18 |
| 0446059 | 9/1991 | (EP) | C08F/10/00 |
| 911180 | 9/1991 | (FI) | C08F/10/00 |
| 9426402 | 11/1994 | (WO) | B01F/7/26 |

* cited by examiner

Primary Examiner—Tae Yoon
(74) Attorney, Agent, or Firm—Steinberg & Raskin, P.C.

(57) ABSTRACT

A process for polymerization of olefin monomers by forming a fluid stream containing catalyst, continuously feeding the fluid stream into an elongated polymerization reactor having at least two successive chambers separated by dividing plates having a diameter slightly smaller than that of the polymerization rector, feeding monomers, and an optional catalyst and donor into the polymerization reactor under temperature conditions to polymerize the olefin while maintaining a mixed flow in the chambers to polymerize the monomers and optional comonomer in the fluid, and removing the resultant polymer slurry from the polymerization reactor.

25 Claims, 2 Drawing Sheets

PROCESS AND AN APPARATUS FOR POLYMERIZATION OF OLEFIN MONOMERS

FIELD OF THE INVENTION

This invention relates in an olefin polymerization process and particularly a process for polymerization of olefins in liquid medium. The invention further relates in polymerization processes containing a prepolymerization step. This invention also relates in an olefin polymerization apparatus.

BACKGROUND OF THE INVENTION

Various methods for manufacturing solid polymers from hydrocarbons, for example from 1-olefins have been developed. In one such method olefins, such as ethylene, propylene or butene, are polymerized in the presence of catalysts in hydrocarbon diluents or in monomers acting as diluents. The reactants are kept in liquid phase by maintaining a proper pressure in the polymerization reactor. When the polymer is insoluble or only slightly soluble in the diluent, the polymer product forms as particles suspended in the diluent and therefore the process is called a slurry process.

As batch process the above process has the advantage that all the polymer particles have the same residence time in the reactor and therefor the product quality is even. However, in commercial high production plants the polymerization reactors tend to be large. The operation is labor extensive and the quality of the products from batch to batch is not the same. For these reasons the batch reactors are not commercially acceptable.

A typical continuous slurry process is carried out in a continuous pipe reactor forming a loop, where the polymerization is carried out in a circulating turbulent flow. The product containing polymer, diluent and monomers, is taken from the loop reactor either continuously, or more usually, periodically through a discharge valve and it is introduced to a separator, where the polymer is separated by lowering the pressure.

Another reactor type in olefin polymerization art is a gas phase reactor, where polymerization is carried out in the presence of catalysts and gaseous monomers. Typically the polymerization is carried out in fluidized bed reactors, where polymerization is carried out continuouly in a bed formed by polymerizing polymer particles. This bed is kept in fluidized state by circulating gaseous flow from the top of the reactor to the bottom of the reactor. Polymerization heat is removed by cooling said circulating gaseous flow.

It is also known continuous multiphase processes, where slurry reactors, such as loop reactors are followed by one or more gas phase reactors or where two or more gas phase reactors are used in series.

A known problem in continuous processes is that even residence time of catalyst is difficult to achieve. Therefore the product quality tends to be more or less uneven. This phenomena is exaggerated in multiphase processes. The catalyst is usually fed into the first reactor only. Some of the catalyst particles react with the monomers for a longer period, whereas part of the catalysts flows straight through the reactor and will be removed more or less unreacted. In the next reactor the unreacted catalyst particles react differently with monomers and resulting, among others, in uneven product quality, gels, lumps and more difficult process control.

It is also known to prepolymerize a small amount of olefin monomer with a catalyst before using these catalysts into a main polymerization reactor. Typically such prepolymerization reduces catalyst attrition and improves the resulting polymer morphology. Prepolymerized catalysts also may suspend more readily in hydrocarbon solvents, yield polymers of higher bulk density and reduce formation of lumps in gas phase reactor.

Such prepolymerization can be carried out by contacting a solid catalyst component with a small amount of olefin monomer in a suitable diluent or monomer in a vessel separate from the main polymerization reactor.

The most convenient way to prepolymerize is a continuous prepolymerization, but due to residence time distribution, part of the catalyst will not prepolymerize enough and will produce fines in the main polymerization reactor. A batch prepolymerization often reduces the catalyst activity and there is always some difference between prepolymerized catalyst batches. Some catalysts have to be prepolymerized so much that the amount of polymer may cause the catalyst handling to be too troublesome.

Some catalyst feeders feed small batches of catalyst with a cycle time of several seconds or minutes. This sometimes causes fluctuation in prepolymerization or in actual polymerization.

The common problem in all polymerization processes mentioned above is uneven residence time distribution, which leads to uneven and undesirable product quality and more difficult process control. This problem can be to some extent avoided if tubular, very long reactors having a very small diameter is used. For example in EP 0279153 a prepolymerization method is disclosed, where the prepolymerization is carried out as a plug flow. However, that kind of reactors are difficult to control and they are not suitable for high production rates because of risk of plugging and low capacity.

Therefore need exists for olefin polymerization processes where the polymerization can be carried out so that more narrow residence time distribution can be achieved and the problems arising from the uneven polymerization degree can be avoided.

OBJECTS AND SUMMARY OF THE INVENTION

The object of the present invention is to achieve a polymerization process, where the disadvantages described above can be avoided. Another object of the present invention is to achieve a process for olefin polymerization, which can be applied as well in normal polymerization as catalyst prepolymerization. Still another object of the invention is to achieve polymerization processes where the catalyst used is prepolymerized in certain way.

Thus the invention concerns a process for polymerization of olefin monomer in fluid medium in the presence of olefin polymerizing catalyst, diluent and optional co-catalyst and donors, said process comprising the steps:

forming a fluid stream containing said catalyst, continuously feeding said fluid stream into an elongated polymerization reactor comprising at least two successive chambers separated by dividing plates having a diameter slightly smaller than that of the polymerization reactor, feeding into said polymerization reactor monomer and optionally cocatalyst and donor under temperature conditions to polymerize said olefin while maintaining a mixed flow in said chambers to polymerize the monomer and optional comonomer in the fluid, and removing the resulting polymer slurry from said polymerization reactor.

The invention also concerns an apparatus for polymerization of olefin monomer and optionally other monomer in the presence of olefin polymerizing catalyst, diluent and optional cocatalyst and donors, said apparatus comprising:

means for continuously feeding a fluid stream containing said catalyst into an elongated polymerization reactor comprising at least two successive chambers separated by dividing plates having a diameter slightly smaller than that of the polymerization reactor, means for feeding into said polymerization reactor monomer and optionally cocatalyst and donor under temperature conditions to polymerize said olefin while maintaining a mixed flow in said chambers to polymerize the monomer and optional comonomer in the fluid, and means for removing the resulting polymer slurry from said polymerization reactor.

The invention also concerns an apparatus for prepolymerizing olefin polymerization catalyst.

According to the invention the polymerization takes place in an elongated reactor, preferably in cylinder-like reactor, which has an inside diameter greater than that of the inlet and outlet points. The term "elongated" means that the length/diameter ratio of the reactor is greater than 2, preferably more than 2,5

According to the invention the polymerization reactor comprises at least two successive chambers separated by dividing plates having a diameter slightly smaller than that of the polymerization reactor. Preferably the polymerization reactor is divided to several successive chambers.

In such polymerization reactor preferably each part of the chambers can be equipped with some mixing device in order to eliminate the deposition of the catalyst or forming polymer onto the surfaces of the polymerization reactor. As mixer device one or more rotating or static mixers can be used. The static mixers may also be attached to the walls of the reactor.

The chambers are divided from each other with plate-like members so that a narrow gap is situated between the chambers. Therefore the diameter of the plates is preferably slightly smaller than the inside diameter of the polymerization reactor. However, it is also possible that the diameter of the dividing plates is smaller. Generally it can be said that the diameter can be 1–25 mm less than the inner diameter of the reactor. When the polymerization reactor is divided to several chambers, the diameter of the dividing plates can decrease thereby eliminating the risk of plugging. The gap between the diameter of the reactor and the diameter of the dividing plate in the last chamber is preferably smaller than the diameter of the outlet opening of the reactor.

According to one embodiment of the invention the dividing plates and the mixers between the dividing plates are attached to the same shaft.

Liquid and the catalyst particles flow to the next chamber between the separation plate and the wall of the reactor. Rotation of the disk keeps the area clean. In the first chamber of the reactor the catalyst mean residence time is of at least 3 times, preferably 10 times the cycle time of the catalyst feeder to assure that there is minimal fluctuation in the catalyst feed to the actual polymerization in the later chambers.

The reactor can be vertical or horizontal, although the vertical position is preferable. Plug flow behaviour in the reactor according to the invention assures that every active catalyst particle has enough prepolymer to prevent the breakage in later polymerization.

As an additional feature the reactor according to the invention can contain additional flow mixing means located in the inner surface of the reactor. Such means can, for example, be studs attached to the inner surfaces of the reactor in some or each chambers and/or the cover plate of the reactor. Such mixing elements enhance the mixing effect by forcing flow from the reactor walls towards the central parts of the reactor.

The flow mixing means can also comprise supporting bars, which support a bearing block for the central shaft. The bars are preferably locked by friction on the reactor walls or by other means.

A fluid carrier stream containing the polymerization catalyst or part of the polymerization catalyst is formed and fed into this reactor. A second stream of polymerizable monomer or monomers is also fed to the reactor. Other components of the catalyst system can also be fed to this reactor.

As fluid carrier stream inert hydrocarbon diluents can be used. Such diluents include, among others, propane, butane, pentane, hexane and alike. Also polymerizable monomers can be used as the fluid carrier. Such monomers include for example propylene, butene and hexene. The mixtures of the fluid carriers mentioned can also be used.

The polymerization takes place inside of the reactor as a mixed plug flow. This term means that the flow inside of the reactor takes place as mixed flow, the flow direction of which is, however, generally forward from one end of the reactor to other end. No part of the reactor contents flows backwards through the reactor and no stagnant flow regions exist where the flow remains in place longer than other parts of the flow.

The residence time in the reactor depends on such factors as the catalyst used or the polymerization degree desired, but generally the advantages of the invention are achieved when the residence time is more than one minute, preferably from two minutes to 30 minutes. A shorter time is sufficient when the polymerization reactor is used as a prepolymerization reactor and longer periods are necessary when the polymerization reactor is used as the ordinary polymerization reactor.

At least part of the cocatalyst is fed to the first chamber of the reactor according to the invention. The monomer or monomers can be fed to any or every chamber of the reactor. In case of propylene polymerization also the donor can be fed to any of the chambers or along with the catalyst.

The polymerization heat is removed by cooling. The cooling can be carried out with a cooling jacket surrounding the polymerization reactor. However, other methods for cooling can also be used.

The reaction temperature can be selected within a wide range, for example in the range of 0° C. to 90° C. The pressure can be likewise selected within a wide range, for example between 10 bar–100 bar. The cooling jacket can be divided into several compartments to make possible to use temperature gradient over the length of the reactor.

Use of solid, transition metal-base polymerization catalysts for polymerization of olefins is well known. Typically these catalysts are based a complex derived from a halide of a transition metals, such as titanium, vanadium, chromium and zirconium, and a cocatalyst, which are typically based on metal alkyls, such as organoaluminum compounds. A typical catalyst comprises a titanium halide, which is supported on a magnesium halide complexed with an alkyl aluminum. It is also known to use electron donors or Lewis bases for controlling the stereospecifity of the polymer. Examples of such electron donors are, among the others, ethers, esters and siloxanes. Except of Ziegler-Natta catalysts described above also metallocene type catalysts can be used according to the invention.

The catalyst component to be fed to the reactor can also be mixed in appropriate medium. Such medium can be for example hydrocarbon wax. The catalyst can also be prepolymerized in conventional way and further treatment is carried out according to the invention.

The process of the invention is particularly advantageous in prepolymerization of such catalysts. Every stage of prepolymerization can be carried out in different conditions. Eg. temperature, monomer, diluent, cocatalyst and donor concentrations can be varied. Different monomers can be used in different stages of prepolymerization. Different components can be contacted in certain order to achieve optimum performance of the catalyst. Further conventional antistatic agents can be fed to the reactor in any desired point.

The design of the reactor according to the invention is easy to manufacture. No extra flanges or walls are needed which could plug the reactor. The number of chambers can changed simply by reducing or adding separation plates and mixing elements also afterwards.

The process according to the invention is particularly advantageous applied as prepolymerization step in various polymerization process. Thus one object of the invention is a process for polymerization of olefin monomer in the presence of olefin polymerizing catalyst, diluent and optional cocatalyst and donors, by feeding into at least one polymerization reactor monomer(s), diluent, catalyst, cocatalyst and optional hydrogen and/or donor under temperature conditions to polymerize said olefin(s) to olefin polymers and after polymerization removing said polymers from the reactor. The process is characterized in that the catalyst fed into the polymerization reactor is prepolymerized by forming a fluid carrier stream containing said catalyst, continuously flowing said carrier stream into an elongated prepolymerization chamber containing at least two successive chambers separated by dividing plates having a diameter slightly smaller than that of the prepolymerization chamber, feeding into said prepolymerization chamber monomer and optionally cocatalyst and donor by maintaining a mixed plug flow in said prepolymerization chamber for a period of at least one minute under temperature conditions to prepolymerize said olefin onto said catalyst, and feeding said prepolymerized catalyst into the first polymerization reactor.

Thus the prepolymerization of the catalyst is carried out first and the process further can comprise one or more slurry reactors after said prepolymerization step. The slurry reactors can be conventional stirred-tank reactors or loop reactors.

The process according to the invention can also comprise also a process where the preceding prepolymerization step is followed by one or more gas phase reactors.

Further the polymerization process following the preceding prepolymerization step can also be a combination of slurry and gas phase polymerization steps. The slurry polymerization step is preferably a loop reactor step.

In slurry processes the pressure in the prepolymerization vessel is selected preferably so that it is higher than in the following reactor. Thus the transfer of the prepolymerized catalyst from the prepolymerization chamber into the slurry reactor is as easy as possible, because the catalyst can be straight moved to the next reactor. Thus the pressure can be for instance between 40–90 bar, preferably 50–70 bar, however provided that the pressure is higher than in the next slurry reactor. The transfer of the prepolymerized catalyst can be carried out also periodically, if desired, and also conventional catalyst transfer devices can be used, if necessary.

It is recommendable that the whole catalyst amount in the process will be fed to the prepolymerization according to the invention and no extra catalysts will be fed to the slurry reactor or reactors. Instead it is possible to feed the cocatalyst either only to the prepolymerization step or partly into the prepolymerization chamber and partly to the slurry polymerization reactor or reactors.

Low boiling inert hydrocarbon is fed to the slurry reactor as polymerizing medium. Examples of suitable hydrocarbons are aliphatic hydrocarbons like propane, butane, pentane and hexane. Advantageous hydrocarbons are especially propane and isobutane. It is also possible to use a mixture of one or more hydrocarbons mentioned before. In the case of propylene polymerization the polymerization medium is preferably propylene.

The reaction mixture consisting of a reaction mixture from previous reactor together with added fresh monomer, hydrogen, optional comonomer and cocatalyst is circulated continuously through the slurry reactor, whereby more suspension of polymer in particle form in a hydrocarbon medium or monomer will be produced. The conditions of the slurry reactor will be chosen so that at least 12 w-% of the whole production will be polymerized in each slurry reactor. The temperature can be chosen within the range of 40–110° C., advantageously within the range 50–100° C. The reaction pressure can be chosen within the range of 40–90 bar, preferably within the range or 50–70 bar, however provided that the reaction pressure is lower than the pressure of the previous reactor. The residence time must be at least 10 minutes, but preferably in the range of 0.5–2 hours.

In slurry polymerization more than one reactors can be used in series. In such case the polymer suspension in an inert hydrocarbon or in monomer produced in the slurry reactor is fed without the separation of inert components and monomers periodically or continuously directly to the latter slurry reactor, which acts in lower pressure than the previous slurry reactor.

Further it is possible to operate one or more slurry reactors at temperatures and pressures that are above the critical temperature and pressure of the polymerization medium. The polymerization then takes place under supercritical conditions.

The type of the slurry reactor(s) can be conventional stirred-tank reactors or loop reactors or the combination thereof. Preferably loop reactors are used.

The reactor according to the invention can be used also as a prepolymerization reactor before one or more gas phase reactors. Gas phase reactor can be an ordinary fluidized bed reactor, although other types of gas phase reactors can be used. In a fluidized bed reactor the bed consists of the formed and growing polymer particles as well as still active catalyst come along with the polymer fraction. The bed is kept in a fluidized state by introducing gaseous components, for instance monomer on such flowing rate which will make the particles act as a fluid. The fluidizing gas can contain also inert carrier gases, like nitrogen and also hydrogen as a modifier.

The gas phase reactor used can operate at temperature region between 50–115° C., preferably between 60–110° C. and the reaction pressure between 10–40 bar and the partial pressure of monomer between 2–30 bar.

According to still another embodiment the reactor of the invention is used as a prepolymerization reactor which is followed by a slurry reactor or reactors and a gas phase reactor or reactors.

In every polymerization step it is possible to use also comonomers selected from ethylene, propylene, butene, pentene, hexene and alike as well as their mixtures.

DETAILED DESCRIPTION OF THE PREFERRED EMBODIMENTS

Figure 1A:
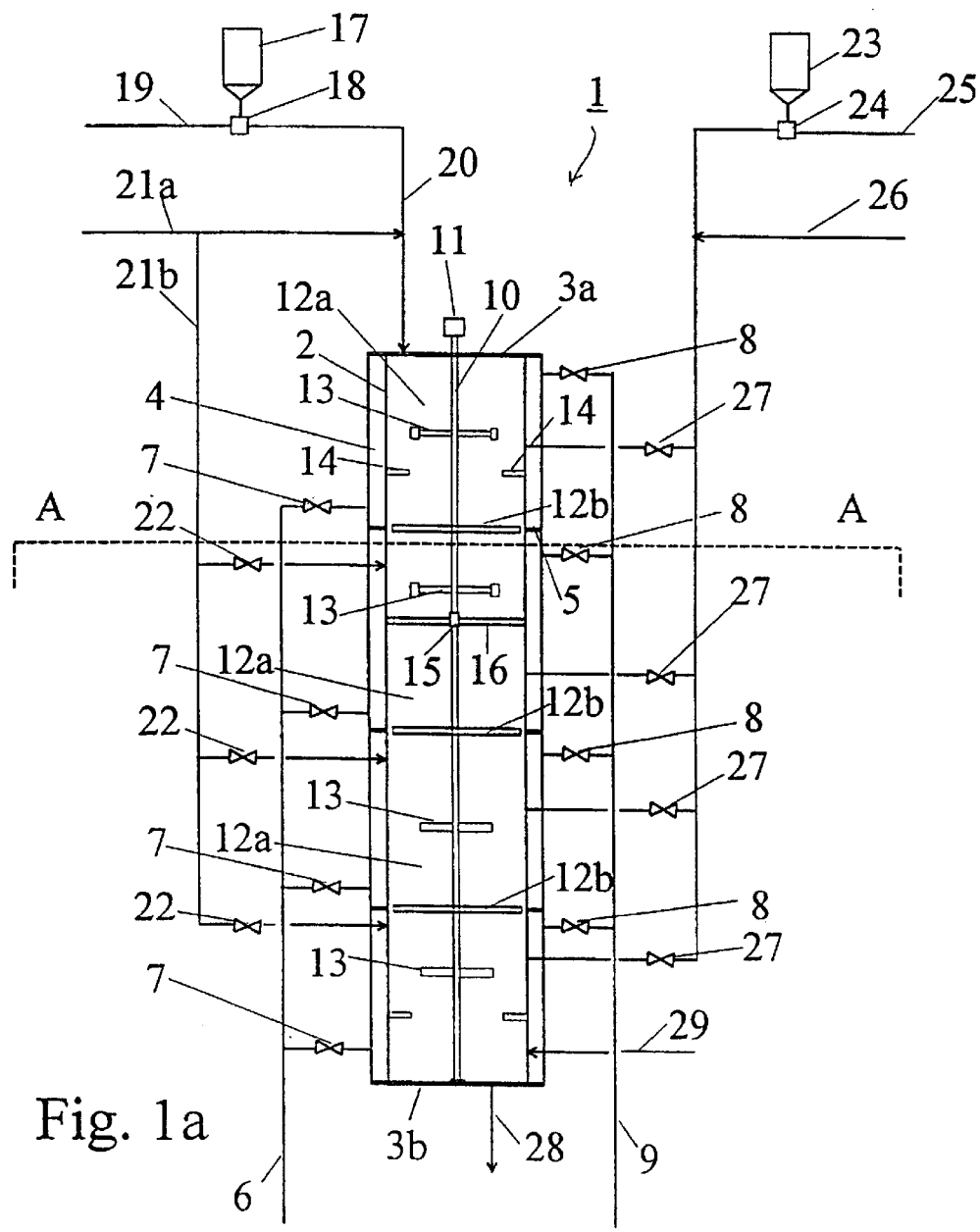
FIG. 1a illustrates the polymerization device according to the invention, which can be applied as a polymerization reactor or as prepolymerization reactor.
Figure 1B:
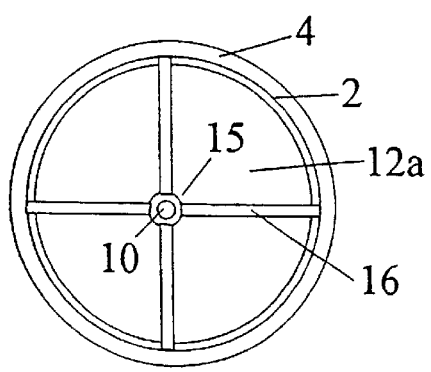
FIG. 1b is an enlargened cross-sectional view of the reactor of FIG. 1a along the line A—A.

In FIG. 1a and 1b the polymerization reactor according to the invention is denoted by a numeral 1. The polymerization reactor 1 has a generally elongated cylindrical form defined by inner surface 2, deck plate 3a and bottom plate 3b. The length/diameter ratio of the reactor 1 is at least 2, preferably more than 2.5. The reactor 1 can be cooled by a cooling jacket 4, which can partly or entirely surround the inner wall 2 of the reactor 1. The cooling jacket 4 can be divided to several separate cooling chambers by separators 5. Cooling medium is introduced to the cooling jacket 4 by line 6 and valves 7 and it is removed from the cooling jacket 4 through valves 8 and line 9. Thus different reaction temperatures can be applied in the reactor when needed.

The reactor is equipped with a central shaft 10 extending over the height of the reactor 1. The shaft 10 is rotated by suitable means 11. The inside volume of the reactor 1 is divided into at least two chambers 12a by dividing plates 12b attached to the central shaft 10. The diameter of each dividing plate 12b is slightly smaller than the inside diameter of the reactor 1 leaving a gap of 2–25 mm between the edge of the dividing plate 12b and the inside wall of the reactor 2. The number of the dividing plates 12b can be varied between 1 to 100 thereby allowing two or more sequential polymerization chambers 12a inside the reactor 1.

The reactor 1 is further equipped with mixing elements 13 inside of the chambers 12a. The mixing elements 13 are attached to the central shaft 10 to rotate along with it. The mixing elements 13 can be also static elements 14 attached into the inside wall 2 of the reactor 1 and extending inside of the chambers 12a. Such static mixers 14 can be located in different places in the reactor wall 2 and also in the deck and bottom plates 3a,3b of the reactor 1.

The shaft 10 can also be supported by bearing block 15. In such arrangement the bearing block 15 is supported to the inside wall 2 of the reactor 1 by bars 16. The supporting bars 16 give an efficient mixing effect on the circulating flow of the polymerization medium in the reactor 1. The ends of the supporting bars 16 can be supported on the reactor wall 2 by friction or by other means thereby preventing the rotation.

The catalyst from reservoir 17 is fed to the feeding device 18 where it is mixed with a diluent from line 19 and is further fed to the reactor 1 through line 20. The same or different monomers can be fed to the reactor 1 through lines 21a and/or line 21b and valves 22. Cocatalyst and donors can be fed into the reactor 1 from reservoir 23 and a feeding device 24 with a diluent from line 25. In the same wise same or different cocatalysts and monomers can be fed into the reactor 1 from line 26 and valves 27.

The polymer or prepolymer is removed from the reactor 1 through line 28. From line 29 it is possible to feed also antistatic agents to the polymer or prepolymer.

Figure 2:
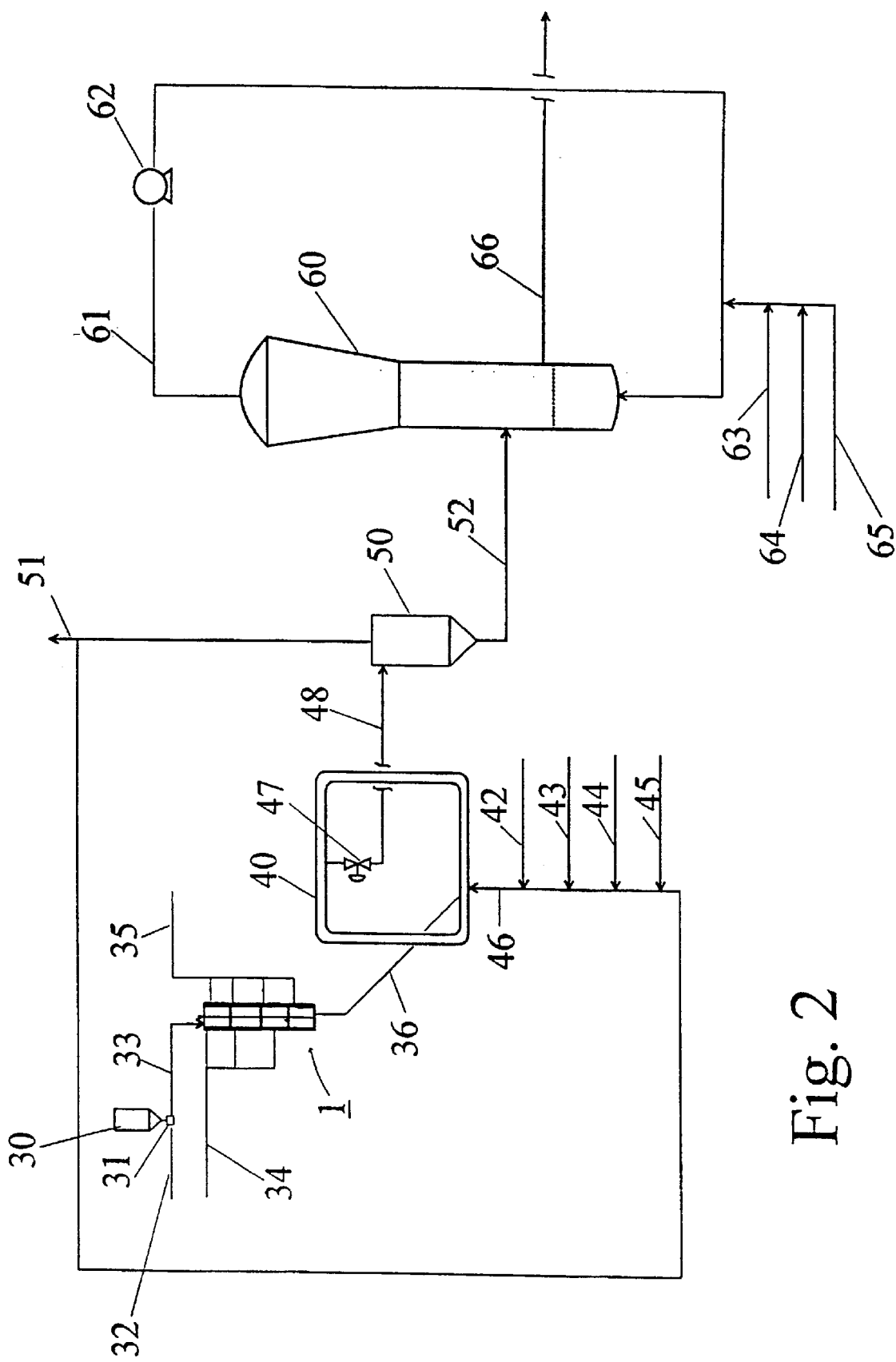
FIG. 2 is a schematic flow graph one preferable embodiment of the invention comprising a prepolymerization reactor followed by a loop reactor and a gas phase reactor.

In FIG. 2 it is presented a schematic view of one process where the prepolymerization reactor 1 according to the invention is used combined with loop-gas phase sequence.

Catalyst from reservoir 30 is fed to the feeding device 31 together with diluent from line 32. The feeding device 31 feeds the catalyst/diluent mixture into the prepolymerization chamber 1 via line 33. Monomer is fed through line 34 and cocatalyst and possible donors can be fed into the reactor 1 through lines 35.

From the prepolymerization chamber 1 the prepolymerized catalyst is removed preferably directly through line 36 to a loop reactor 40. In the loop reactor 40 the polymerization is continued by adding a diluent from the line 42, monomer from line 43, hydrogen from line 44 and an optional comonomer from line 45 through the line 46. To the loop reactor 40 it can be added also optional cocatalyst in an ordinary way (not presented).

From the loop reactor 40 the polymer-hydrocarbon mixture is fed through one or several exhaust valve 47 and the product transfer line 48 to the flash separator 50. The hydrocarbon medium removed from the polymer particles, the remaining monomer and hydrogen are removed from the flash separator 50 either through the line 51 to the recovery unit (not presented) or back to the loop reactor 40 through the line 46. The polymer particles are removed from the flash separator 50 through the removing line 52 to the gas phase reactor 60.

In the lower part of the gas phase reactor 60 there is a bed consisted of polymer particles, which will be kept in a fluidized state in an ordinary way by circulating the gases removed from the top of the reactor 60 through line 61, compressor 62 and the heat exchanger (not presented) to the lower part of the reactor 60 in an ordinary way. The reactor 60 is advantageously, but not necessarily, equipped by a mixer (not presented). To the lower part of the reactor 60 can be led in a well known way monomers from line 63, optionally comonomer from line 64 and hydrogen from the line 65. The product will be removed from the reactor 60 continually or periodically through the transfer line 66 to the recovery system (not presented).

EXAMPLES

Highly active catalyst and highly active polymerization conditions (e.g. enough hydrogen) were used to test the properties of the novel system. For the examples 1–6 highly isotactic (98±1%) homopolymer with MFR (2,16 kg 230° C.) 20±1 g/10 min was produced. Normal temperature of 70° C. and higher temperature of 94° C. were tested in the actual polymerization.

Example 1

A pilot plant operated continuously was used to produce PP-homopolymer. The plant comprises a catalyst, alkyl, donor and propylene feed systems and a small stirred tank reactor named as CCSTR due to several compartments. Said components are fed to the CCSTR.

The catalyst used was a highly active and stereospecific ZN-catalyst made according to Finnish Patent No. 88047. The catalyst was contacted with triethylaluminium (TEA) and dicyclopentyldimethoxysilane (DCPDMS) (Al/Ti ratio was 3 and Al/donor was 3 (mole)) before feeding to the CCSTR.

The catalyst was fed according to Finnish Patent No. 90540 and was flushed with propylene (15 kg/h) to the CCSTR in which also TEA and DCPDMS are fed. The CCSTR was operated at 40 bar pressure, 20° C. temperature and mean residence time of the catalyst at 3 min. Al/Ti (mole) ratio was kept at 150 and Al/donor ratio at 5.

The loop reactor was operated at 39 bar pressure, 70° C. temperature and mean residence time of the catalyst at 3 h. The solid polymer was separated from the polymer slurry by depressurising. The MFR (2.16 kg, 230° C.) of the produced PP-homopolymer was controlled to be 20 via hydrogen feed. Product characteristics is shown in Table I.

Example 2 (Comparative)

Procedure was the same as Example 1 but the compartmented CCSTR was replaced with normal continuous stirred-tank reactor (CSTR).

Example 3

Procedure of the Example 1 was repeated.

Example 4

Procedure was the same as Example 1 but the mean residence time of the catalyst was kept at 4 min.

Example 5 (Comparative)

Procedure was the same as Example 4 but the compartmented CCSTR was replaced with normal CSTR.

Example 6

Procedure was the same as Example 1 but the mean residence time of the catalyst was kept at 2 min.

Example 7 (Comparative)

Procedure was the same as Example 6 but no continuous prepolymerization was used. The catalyst was prepolymerized with propylene (the mass ratio of PP/cat was 10) in batch according to Finnish Patent No. 95387.

The catalyst was mixed with TEA and DCPDMS and flushed with cold propylene to the loop reactor.

Example 8 (Comparative)

Procedure was the same as Example 2 (comparative) but the catalyst was pre-polymerized with propylene (the mass ratio of PP/cat was 10) in batch according to Finnish Patent No. 95387 before continuous prepolymerization.

Example 9

A pilot plant operated continuously was used to produce PP-homopolymer. The plant comprises a catalyst, alkyl, donor and propylene feed systems and a stirred tank reactor named as CCSTR due to several compartments. Said components are fed to the CCSTR.

The catalyst according to Example 1 was fed into the CCSTR-reactor, which was operated at 51 bar pressure, 20° C. temperature and mean residence time of the catalyst at 5 min. Al/Ti (mole) ratio was kept at 75 and Al/donor ratio at 5.

The polymer slurry from the CCSTR was fed to a loop reactor in which also hydrogen and more propylene was fed. The loop reactor was operated at 50 bar pressure, 94° C. temperature and mean residence time of the catalyst at 30 min. The solid polymer was separated from the fluid by depressurising. The MFR (2.16 kg, 230° C.) of the produced PP-homopolymer was controlled to be 20 via hydrogen feed. Product characteristics is shown in Table II.

Example 10 (Comparative)

Procedure was the same as Example 9 but no continuous prepolymerization was used. The catalyst was prepolymerized with propylene (the mass ratio of PP/cat was 10) in batch according to Finnish Patent No. 95387.

The catalyst was mixed with TEA and DCPDMS and flushed with cold propylene to the slurry reactor.

Example 11 (Comparative)

As Example 7 (comparative) except that the catalyst was prepolymerized to mass ratio of 7 (PP/cat) in batch according to Finnish Patent No. 95387, cyclohexyl-methylmethoxysilane (CHMMS) was used as donor, Al/Ti (mole) ratio was kept at 100 in the loop reactor, and MFR (2.16 kg, 230° C.) of the produced PP-homo-polymer was controlled to be 2.5 via hydrogen feed.

Product characteristics are shown in Table III.

Example 12 (Comparative)

As Example 11 (comparative) except that a small diameter pipe with inner diameter of 4 mm was used and the length of the pipe was selected to give 20 second residence time for the catalyst and the pipe was operated at 0° C.

Example 13 (Comparative)

As Example 12 (comparative) but the pipe was operated at 20° C.

Example 14 (Comparative)

As Example 13 (comparative) but the length of the pipe was selected to give to give 40 second residence time for the catalyst. Line was impossible to operate for longer period of time—no product characteristics available.

Example 15

Procedure was the same as Example 1 but the temperature of the upper part of prepolymerization reactor was 20° C. and the temperature of the lowest part of prepolymerization reactor was 40° C. The mean residence time of the catalyst was at 7 min. 50 w-% from total hydrogen feed was fed into the prepolymerizatior reactor and 50 w-% into the loop-reactor.

Product characteristics are shown in Table IV.

Example 16

Procedure was the same as Example 1 but the compartment CCSTR was replaced with two compartments (separated by one dividing plate) on upper part of prepol. reactor and in lowest part with three vertical equalizing grids.

Example 17

Procedure was the same as Example 16 but a metallocene catalyst, rac-dimethyl-silanediyldiyl-bis-1,1'-(2-methyl-4-phenylindenyl)zirconium dichloride supported on porous $SiO_2$, was used. The catalyst was flushed into the prepolymerization reactor with propane feed. Not any cocatalyst or donor were fed. The mean residence time of the catalyst was kept at 9 min. The temperature of the upper part of prepolymerization reactor was 15° C. and the temperature of the lowest part of prepolymerization reactor was 13° C. The morphology of the PP homopolymer was excellent (not any fines). Operability of the process was good.

Example 18 (Comparative)

Procedure was the same as Example 17 but not continuous prepolymerization was used. The catalyst was prepolymerized with propylene (the mass ratio of PP/cat was 1.3) in batch (dry prepolymerization in gas phase), in the product of the loop reactor was lot of fines and loop fouling was observed.

Example 19

As Example 17 but no batch prepolymerization was used.

Example 20 (Comparative)

As Example 19 but no continuous prepolymerization was used.

Example 21

Same as Example 19 but the temperature of the prepolymerization was kept at 25° C. and the residence time of the catalyst was kept at 7 min.

Examples show that in polymerization of polyolefin polymer with highly active and stereospecific ZN-catalyst the amount of fines can be reduced by using a novel CCSTR as a prepolymerization system compared to traditional batchwise prepolymerization or a simple CSTR type reactor.

Examples also show that combination or traditional batchwise prepolymerization and a continues prepolymerization can be useful.

Further more examples show that for fines reduction a short time pipe prepolymerization was not useful even in producing as low MFR as 2.5 g/10 min.

TABLE I

| Example | Batch prepolym. | Reactor type | Temp. ° C. | Prepol. time min | 2.0 mm % | 1.0 mm % | 0.5 mm % | 0.18 mm % | Fines % | BD g/m³ |
|---|---|---|---|---|---|---|---|---|---|---|
| 1 | No | CCSTR | 20 | 3 | 4.9 | 34.6 | 32.3 | 25.2 | 3.1 | 0.44 |
| 2 (Comp.) | No | CSTR | 20 | 3 | 2.3 | 23.1 | 30.5 | 36.4 | 7.7 | 0.40 |
| 3 | No | CCSTR | 20 | 3 | 9.3 | 32.2 | 31.3 | 23.4 | 4.0 | 0.40 |
| 4 | No | CCSTR | 20 | 4 | 9.6 | 49.2 | 21.9 | 16.9 | 2.5 | 0.45 |
| 5 (Comp.) | No | CSTR | 20 | 4 | 6.2 | 35.2 | 27.4 | 22.8 | 8.4 | 0.41 |
| 6 | No | CCSTR | 20 | 2 | 3.7 | 36.2 | 32.5 | 24.2 | 3.3 | 0.43 |
| 7 (Comp.) | No | — | — | — | 0.2 | 12.2 | 49 | 33.1 | 5.3 | 0.36 |
| 8 | Yes | CSTR | 20 | 3 | 0.3 | 12.9 | 58.3 | 26.2 | 2.4 | 0.40 |

TABLE II

| Example | Batch prepolym. | Reactor type | Temp. °C. | Prepol. time min | 2.0 mm % | 1.0 min % | 0.5 mm % | 0.18 mm % | Fines % | BD g/m$^3$ |
|---|---|---|---|---|---|---|---|---|---|---|
| 9 | No | CCSTR | 20 | 5 | 2.9 | 56.4 | 21.7 | 14.0 | 4.9 | 0.55 |
| 10 (Comp.) | Yes | — | — | — | 12.8 | 43.3 | 17.0 | 14.3 | 12.6 | 0.46 |

TABLE III

| Example | Batch prepolym. | Reactor type | Temp. °C. | Prepol. time min | 2.0 mm % | 1.0 mm % | 0.5 mm % | 0.18 mm % | Fines % | BD g/m$^3$ |
|---|---|---|---|---|---|---|---|---|---|---|
| 11 (Comp.) | Yes | — | — | — | 2.7 | 26.2 | 54.3 | 16.1 | 0.7 | 0.41 |
| 12 (Comp.) | Yes | PIPE | 0 | 20 | 3.7 | 23.5 | 58.6 | 12.6 | 1.5 | 0.43 |
| 13 (Comp.) | Yes | PIPE | 20 | 20 | 4.8 | 30.2 | 54.1 | 10.2 | 0.7 | 0.44 |

TABLE IV

| Example | Catalyst | Batch prepolym. | Prepol. reactor type | Temp. upper part | Temp. lowest part | Prepol. time min. | 2.0 mm % | 1.0 mm % | 0.5 mm % | 0.18 mm % | Fines % | BD |
|---|---|---|---|---|---|---|---|---|---|---|---|---|
| 15 | ZN | no | CCSTR | 20 | 40 | 7 | 28.1 | 40.6 | 25.2 | 6.1 | 0 | 0.39 |
| 16 | ZN | no | *CCSTR | 20 | 30 | 8 | 16.2 | 62.2 | 18 | 3.6 | 0 | 0.3 |
| 17 | SSC | yes | *CCSTR | 15 | 13 | 9 | Excellent morfology, not any fines. Good operability. | | | | | |
| 18 (Comp.) | SSC | yes | no continuous prepolymerization was used | | | | Poor morfology, lot of fines. Bad fouling of the loop reactor walls. | | | | | |
| 19 | SSC | no | *CCSTR | 15 | 13 | 9 | Excellent morfology, not any fines. Good operability. | | | | | |
| 20 (Comp.) | SSC | no | no continuous prepolymerization was used | | | | Poor morfology, lot of fines. Bad fouling of the loop reactor walls. | | | | | |
| 21 | SSC | no | *CCSTR | 25 | 25 | 7 | Excellent morfology, not any fines. Good operability. | | | | | |

*two compartments and three vertical equalizing grids

What is claimed is:

1. A process for polymerization of olefin monomer and optionally other monomer in the presence of olefin polymerizing catalyst, diluent and optional cocatalyst and donors, said process comprising the steps:
   forming a fluid stream containing said catalyst,
   continuously feeding said fluid stream into an elongated polymerization reactor (1) comprising at least two successive chambers (12a) separated by dividing plates (12b) having a diameter slightly smaller than that of the polymerization reactor (1) thereby defining a space between a peripheral edge of said dividing plates (12b) and a wall of said reactor1,
   feeding into said polymerization reactor (1) monomer and optionally co-catalyst and donor under temperature conditions to polymerize said olefin monomer while maintaining a mixed flow in said chambers (12a) to polymerize the monomer and optional comonomer in the fluid, and
   removing the resulting polymer slurry from said polymerization reactor.

2. A process according to claim 1, characterized in that said polymerization reactor comprises several successive chambers (12a) separated by dividing plates (12b).

3. A process according to claim 2, characterized in that said dividing plates (12b) have a diameter decreasing towards the end of the reactor.

4. A process according to claim 2, characterized in that the gap between the reactor wall and the dividing plate (12b) in the last chamber is smaller than the diameter of the reactor outlet (28).

5. A process according to claim 1, characterized in that said polymerization reactor is equipped with one or more rotating turbine or propeller mixers (13) or static mixers (14) between said chambers (12a).

6. A process according to claim 5, characterized in said dividing plates (12b) and said mixers (13) are attached on the same shaft (10).

7. A process according to claim 1, characterized in that the shaft (10) is supported by one or more bearing blocks (15) and said bearing blocks (15) are supported with bars (16) on the reactor walls (2).

8. A process according to claim 1, characterized in that said polymerization reactor is equipped with a cooling jacket (4).

9. A process according to claim 1, characterized in that one or more of said chambers (12a) have their own inlet (7,8) for feeding monomers, cocatalysts and donors.

10. A process according to claim 9, characterized in that the olefin polymerizing catalyst is prepolymerized before feeding to the polymerization reactor.

11. A process according to claim 1, characterized in that same or different monomers and/or donor compounds and/or cocatalyst are fed in different amounts to each or any of the chambers (12a).

12. A process according to claim 1, characterized in a temperature gradient over the length of the polymerization reactor.

13. A process according to claim 1, characterized in that Ziegler catalysts or metallocen catalysts are used.

14. A process according to claim 1, characterized in that an antistatic agent is fed to the polymerization reactor.

15. A process for polymerization of olefin monomer in the presence of olefin polymerizing catalyst, diluent and optional cocatalyst and donors, by feeding into at least one polymerization reactor monomer(s), diluent, catalyst, cocatalyst and optional hydrogen and/or donor under temperature conditions to polymerize said olefin(s) to olefin polymers and after polymerization removing said polymers from the reactor, characterized in that the catalyst fed into the polymerization reactor is prepolymerized before feeding into said polmerization reactor by forming a fluid carrier stream containing said catalyst, continuously flowing said carrier stream into an elongated prepolymerization reactor (1) containing at least two successive chambers (12a) separated by dividing plates (12b) having a diameter slightly smaller than that of the prepolymerization reactor (1), feeding into said prepolymerization reactor (1) monomer and optionally cocatalyst and donor by maintaining a mixed plug flow in said prepolymerization reactor for a period of at least one minute under temperature conditions to prepolymerize said olefin onto said catalyst, and feeding said prepolymerized catalyst into the first polymerization reactor.

16. A process according to claim 15, characterized in that said prepolymerization reactor (1) comprises several successive chambers (12a) separated by dividing plates (12b) having a diameter decreasing towards the end of the reactor.

17. A process according to claim 15, characterized in that said prepolymerization reactor (1) is equipped with one or more rotating or static mixers (13,14) in said chambers (12a).

18. A process according to claim 15, characterized in that said dividing plates (12b) and said mixers (13) are attached on the same shaft (10).

19. A process according to claim 15, characterized in that one or more of said chambers (12a) have their own inlet for feeding monomers, cocatalysts and donors.

20. A process according to claim 15, characterized in that different monomers and/or donor compounds are fed in different amounts to each of the chambers (12a).

21. A process according to any of the preceding claims 15–20, characterized in that it comprises one or more slurry reactors after said prepolymerization step.

22. A process according to claim 15, characterized in that polymerization in at least one slurry polymerization step takes place at a temperature and a pressure, which are above the critical temparature and pressure of the reaction medium.

23. A process according to claim 15, characterized in that it comprises one or more gas phase reactors after said prepolymerization step.

24. A process according claim 15, characterized in that it comprises one or more slurry reactors followed by one or more gas phase reactors after said prepolymerization step.

25. A process of claim 15, characterized in that monomer is selected from the group consisting of ethylene, propylene, butene, pentene and hexene.

* * * * *

UNITED STATES PATENT AND TRADEMARK OFFICE
CERTIFICATE OF CORRECTION

PATENT NO. : 6,197,264 B1
DATED : March 6, 2001
INVENTOR(S) : Korhonen Esa et al.

It is certified that error appears in the above-identified patent and that said Letters Patent is hereby corrected as shown below:

<u>Title page,</u>
Item [73], should read as follows:
[73] Assignee: Borealis Technology Oy
Porvoo, Finland Signed and Sealed this Seventeenth Day of December, 2002

JAMES E. ROGAN
*Director of the United States Patent and Trademark Office*

UNITED STATES PATENT AND TRADEMARK OFFICE
CERTIFICATE OF CORRECTION

PATENT NO.      : 6,197,264 B1                                    Page 1 of 1
DATED           : March 6, 2001
INVENTOR(S)     : Esa Korhonen et al.

It is certified that error appears in the above-identified patent and that said Letters Patent is hereby corrected as shown below:

<u>Title page,</u>
Item [73], Assignee, should read as follows:

-- Borealis Technology Oy, Porvoo (FI) --.

Signed and Sealed this

Thirteenth Day of May, 2003

JAMES E. ROGAN
*Director of the United States Patent and Trademark Office*